UNITED STATES PATENT OFFICE.

MARVIN J. UDY, OF KOKOMO, INDIANA, AND OLIVER C. RALSTON, OF NIAGARA FALLS, NEW YORK, ASSIGNORS TO HOOKER ELECTROCHEMICAL COMPANY, OF NEW YORK, N. Y., A CORPORATION OF NEW YORK.

PROCESS OF SEPARATING NICKEL AND COBALT.

1,365,358.   Specification of Letters Patent.   Patented Jan. 11, 1921.

No Drawing.   Application filed July 3, 1919. Serial No. 308,389.

*To all whom it may concern:*

Be it known that we (1) MARVIN J. UDY and (2) OLIVER C. RALSTON, citizens of the United States, residing at (1) Kokomo and (2) Niagara Falls, in the counties of (1) Howard and (2) Niagara and States of (1) Indiana and (2) New York, have invented certain new and useful Improvements in Processes of Separating Nickel and Cobalt, of which the following is a specification.

The object of this invention is to provide a simple and efficient method for the separation of nickel and cobalt from solutions of their mixed salts.

It is known that a certain separation as between nickel and cobalt may be accomplished by the use of hypochlorite solutions, by which cobalt is oxidized to the cobaltic state and precipitated in the form of a black oxid, most of the nickel remaining in solution. In the practice of such process, it is necessary however to maintain a very close control of the operating conditions, particularly as regards the alkalinity and temperature of the hypochlorite solution; moreover the separation is incomplete, some nickel being always present in the cobalt precipitate and usually some cobalt in the nickel solution.

We have discovered that a better separation of these metals may be accomplished by treating solutions containing nickel and cobalt, but preferably free from iron, with calcium carbonate or its equivalents and chlorin in excess. At relatively low temperatures (preferably about zero to 40° C.) the cobalt is practically quantitatively precipitated upon the excess of carbonate, while substantially the whole of the nickel remains in solution.

The method is sufficiently exact for use in the quantitative determination of nickel and cobalt, and it is likewise applicable to their industrial separation and recovery. Either sulfate or chlorid solutions may be used, the latter being usually preferred.

For example, in the application of the method to the treatment of nickel-cobalt ores of the type found in the cobalt district of Canada, the metal values are first brought into solution in the form of chlorids by any approved method. Iron is removed by treating the solution with chlorin, removing the excess of chlorin by means of air or otherwise, and then agitating with calcium carbonate or similar precipitant. If the chlorin has been completely removed the iron only is precipitated. The resulting solution, containing nickel and cobalt, but free from iron, is then mixed with finely divided calcium carbonate and gaseous chlorin is bubbled through the pulp. If the solution is kept at a sufficiently low temperature, very pure black cobalt oxid is formed, and practically all of the nickel remains in the solution. At higher temperatures some nickel is also precipitated.

The reactions involved in the separation are not certainly known, although there is reason to believe that a cobaltic salt is first formed and thereafter hydrolyzed, the calcium carbonate acting to neutralize the acid product of the hydrolysis (hydrochloric or sulfuric acid).

Other alkaline earth carbonates, as barium carbonate may replace calcium carbonate in this reaction. The carbonate should be introduced in finely divided state, for example finely powdered limestone, marble, chalk or the like, or preferably, a good grade of so-called "whiting."

The nickel may be recovered from the solution in accordance with any approved method. The cobalt is obtained as oxid in admixture with the excess of carbonate and may be separately recovered by any appropriate method, whether by treatment with solvents or by smelting with reducing agents.

What we claim is:

1. Process of precipitating cobalt from mixed nickel-cobalt solutions, comprising simultaneously subjecting the solution to the action of chlorin and an alkaline earth metal carbonate, at a temperature below that at which a material precipitation of nickel occurs.

2. Process of precipitating cobalt from mixed nickel-cobalt solutions, comprising simultaneously subjecting the solution to the action of chlorin and calcium carbonate, at a temperature below that at which a material precipitation of nickel occurs.

In testimony whereof we affix our signatures.

MARVIN J. UDY.
OLIVER C. RALSTON.